United States Patent
Walter et al.

(10) Patent No.: US 8,981,257 B2
(45) Date of Patent: Mar. 17, 2015

(54) METHOD AND DEVICE FOR LASER-JOINING SHEET METAL PARTS

(75) Inventors: Steffen Walter, Berlin (DE); Igor Haschke, Berlin (DE)

(73) Assignee: Scansonic MI GmbH, Berlin (DE)

( * ) Notice: Subject to any disclaimer, the term of this patent is extended or adjusted under 35 U.S.C. 154(b) by 300 days.

(21) Appl. No.: 13/700,700

(22) PCT Filed: May 25, 2011

(86) PCT No.: PCT/EP2011/058592
§ 371 (c)(1),
(2), (4) Date: Nov. 28, 2012

(87) PCT Pub. No.: WO2011/147891
PCT Pub. Date: Dec. 1, 2011

(65) Prior Publication Data
US 2013/0087538 A1   Apr. 11, 2013

(30) Foreign Application Priority Data
May 28, 2010   (DE) .......................... 10 2010 029 477

(51) Int. Cl.
*B23K 26/20* (2014.01)
*B23K 26/24* (2014.01)
*B23K 26/00* (2014.01)
(Continued)

(52) U.S. Cl.
CPC ................. *B23K 26/00* (2013.01); *B23K 26/20* (2013.01); *B23K 26/023* (2013.01); *B23K 26/0807* (2013.01); *B23K 26/24* (2013.01);
(Continued)

(58) Field of Classification Search
CPC ......... B23K 26/00; B23K 26/20; B23K 26/24
USPC ........... 219/121.62, 121.63, 121.64; 228/212; 403/270, 271, 272
See application file for complete search history.

(56) References Cited

U.S. PATENT DOCUMENTS

| | | | |
|---|---|---|---|
| 5,897,796 A * | 4/1999 | Forrest | 219/121.64 |
| 6,479,786 B1 * | 11/2002 | Fields et al. | 219/121.63 |
| 6,596,962 B2 * | 7/2003 | Haschke | 219/121.64 |
| 2004/0104204 A1 | 6/2004 | Sonoda et al. | |
| 2004/0118818 A1 | 6/2004 | Oda et al. | |

FOREIGN PATENT DOCUMENTS

| | | |
|---|---|---|
| DE | 102007027377 A1 | 1/2008 |
| DE | 102008054040 A1 | 5/2010 |
| EP | 1005944 A2 | 6/2000 |

OTHER PUBLICATIONS

International Search Report and Written Opinion with English Translation for International (PCT) Patent Application No. PCT/EP2011/058592, dated Sep. 12, 2011, 14 pages.
(Continued)

*Primary Examiner* — Samuel M Heinrich
(74) *Attorney, Agent, or Firm* — Sheridan Ross P.C.

(57) ABSTRACT

The invention relates to a device and to an associated method for joining sheet metal parts, each with a flange, by laser, wherein the flanges of the sheet metal parts (2) are joined into one connecting flange. The device has a clamping device (5) for clamping the sheet metal parts (2) to be joined in a main clamping direction running transversely to the connecting flange and a beam guidance system for a laser beam (1). Moreover, the device has a compensation shaft (9) which tracks the laser beam (1) according to a relative movement between the connecting flange and a guidance apparatus.

14 Claims, 8 Drawing Sheets

(51) Int. Cl.
　　*B23K 26/02*　　(2014.01)
　　*B23K 26/08*　　(2014.01)
　　*B23K 26/32*　　(2014.01)
　　*B23K 26/04*　　(2014.01)

(52) U.S. Cl.
　　CPC ......... *B23K26/3206* (2013.01); *B23K 26/3293* (2013.01); *B23K 26/043* (2013.01); *B23K 26/08* (2013.01)
　　USPC ............ 219/121.63; 219/121.64; 219/121.62; 228/212

(56) References Cited

OTHER PUBLICATIONS

Official Action with English Translation for China Patent Application No. 201180036791.8, dated Jun. 18, 2014, 24 pages.
Official Action for German Patent Application No. 102010029477.2, Feb. 2, 2011, 4 pages.
International Search Report prepared by the European Patent Office on Aug. 20, 2011, for International Application No. PCT/EP2011/058592.

* cited by examiner

METHOD AND DEVICE FOR LASER-JOINING SHEET METAL PARTS

CROSS REFERENCE TO RELATED APPLICATIONS

This application is a national stage application under 35 U.S.C. 371 and claims the benefit of PCT Application No. PCT/EP2011/058592 having an international filing date of May 25, 2011, which designated the United States, which PCT application claimed the benefit of German Application No. 102010029477.2 filed May 28, 2010, the disclosures of each of which are incorporated herein by reference.

The invention relates to a method and a device for joining sheet metal parts with flanges, particularly car body components, by laser.

For the purpose of joining, particularly joining by laser, sheets to be joined can be provided with a flange, which is to say an angled edge. In this way, it is possible to produce connecting flanges in which the flanges of the sheets to be connected abut each other, thus forming a joint with a flange plane.

The laser-welding of I-seams in the lap joint has long been established in car body engineering. For example, weld seams at doorways or along roof edges are produced according to this principle. Here, so-called "flying optics" are usually used in connection with stationary or moving clamping systems. Special modifications of the method are intended to influence the degassing conditions for the vaporizing zinc of the corrosion protection layer in order to improve the seam quality. Only a few methods will be named here for the sake of example.

DE 10 2004 044601 A1 discloses a method in which, through the targeted arrangement of moving clamping elements, the plates in the overlap are deformed such that a degassing gap is brought about in order to improve the weld quality. In seams that are not straight, e.g., on radii in corners of doors, it is difficult to produce a defined gap. Multiple joints cannot be controlled using the method.

DE 102 48955 B3 discloses a method in which the use of two laser beams, one coming from above and the other from below, makes it possible to join 3 sheets by means of moving clamping technology in connection with a degassing device.

DE 10 2004 041502 A1 discloses a method in which, through modulation of the laser beam, the vapor capillary is stabilized and an improved welding result is achieved. The determination of the necessary modulation characteristics is done here substantially by empirical means, which requires some effort in determining the modulation parameters for specific components.

In order to circumvent the drawbacks of the I-seams in the lap joint, fillet welds are often used on the lap joint. In particular, through a special arrangement of the sheets in the area of overlap, the degassing can be improved. DE 102 61507 A1 discloses a method in which the overlapping sheets in the area of the weld seam come together at a sharp angle, and the weld seam is executed as a fillet weld in the area or proximity of the curve of one of the sheets. In order to achieve the precision in the positioning of the laser spot with respect to the joint required to produce fillet welds, a method is described in DE 100 06852 C5 in which the filler metal is used as a mechanical sensing element in the form of a wire and the tip of the wire melting off at the energy beam is guided nonpositively along the surface of the material.

The beam direction during the joining of sheet flange connections in the construction of car bodies is perpendicular or substantially perpendicular to the flange plane, i.e., it passes transversely through the sheets to be joined. If clamping systems which move on doorways or sills, for example, are used during the joining of sheets by laser, the orientation of the laser beam is consequently parallel or substantially parallel to the direction of the action of force of the clamping or pressing system. Common angles here are 0° ... 15°, with a maximum angle of 20°.

The known methods for welding sheets in car body construction have drawbacks. The commonly used laser-welding of I-seams in the lap joint is often characterized by low weld quality due to the outgassing of zinc. In this type of seam, joint defects are difficult or impossible to detect by non-destructive means. A seam that appears perfect on the surface may have joint defects. This danger is particularly great in I-seams in the lap joint. The joint cross section is limited, and the weld penetration is relatively non-reproducible, particularly where multiple sheets are joined. Welding with full penetration causes damage to the zinc layer on the back surface of the sheet. As a result of the practically limited precision of the positioning of the laser spot to the component and the necessary maintenance of defined joint gaps, the flange dimensions are relatively large.

In contrast, the fillet weld on the lap joint, which continues to be widely used, can be produced in higher quality because of the greater possibilities for the degassing of the zinc vapors. At the same time, the seam connections to the two items to be joined can be visually inspected. However, due to the insufficient precision of the positioning of the laser spot, this type of weld often requires a seam guidance system. In order to enlarge the cross section of the joint, a filler metal is also often used. The joint cross section cannot be increased beyond the material thickness of the upper sheet. Because of the necessary weld-on angle to the component, the clamping system must ensure appropriate accessibility, which is oftentimes only possible in connection with relatively large flange dimensions. These relatively large sheet flanges are undesirable in connection with the mass reduction and fuel savings strived for in automotive engineering.

It is the object of the invention to provide a possibility for the joining by laser of sheet metal parts with flanges, particularly car body components, by virtue of which the weld strength and production can be improved to the extent that the flange lengths can be shortened through front penetration welding into the lap joint, for example on the doorway of body shells.

This object is achieved according to the invention on the one hand through a method for joining sheet metal parts by laser and, on the other hand, through a device for joining sheet metal parts by laser.

The method according to the invention for joining sheet metal parts by laser, each with a flange, wherein the flanges of the sheet metal parts are to be joined with a connecting flange, comprises the method steps:

Clamping of sheet metal parts in the area of the connecting flange in a main clamping direction transverse to the connecting flange and simultaneous front penetration welding on the connecting flange through the orientation of a laser beam such that it is substantially parallel to the connecting flange and transverse to the main clamping direction on the front side of at least one of the flanges of the sheet metal parts to be joined, with the processing point being run along the connecting flange in a welding motion relative to the sheet metal parts to be joined in the main clamping direction and/or in the spacing direction.

The device according to the invention for joining by laser sheet metal parts each having a flange comprises:

a clamping device for clamping the sheet metal parts to be joined in a clamping direction running transverse to the connecting flange, and a beam guidance system for a laser beam which is set up to direct a laser beam substantially parallel to the connecting flange and transversely to the clamping direction toward a front side of at least one of the flanges of the sheet metal parts to be joined.

The device further comprises a compensation shaft which, when the device is connected to a guidance apparatus, tracks the laser beam according to a relative motion between the connecting flange and the guidance apparatus.

The compensation shaft is a compensation mechanism which can be implemented both mechanically and optically. According to a mechanical embodiment, a compensation shaft is implemented by means of a movable connection between optical components and the guidance apparatus. According to an optical embodiment, a compensation shaft is implemented by guiding the seam by means of movable optical elements such as mirrors or lenses.

According to one embodiment, the parts of the device that jointly move the clamping device and processing points at which the laser beam strikes the connecting flange are joined with a part fastened to the guidance apparatus by means of at least one compensation shaft.

Using such a device, the flanges if the sheet metal parts to be joined can be joined to a connecting flange and the sheets can be joined together in the area of the joint formed by their mutually abutting flanges.

The use of high-strength and extremely high-strength materials in automotive construction in order to reduce mass makes it necessary to increase the joint cross sections of the weld due to the reduced strength at the joint. The method according to the invention makes it possible on the basis of more favorable seam geometry to enlarge the joint cross sections while maintaining the same sheet thickness, and to structure the seam in such a way that it can be inspected. Thanks to the more favorable arrangement, the processing and clamping system can be set up such that the implementation of minimal flange dimensions is possible. At the same time, through a special arrangement of the method, alternating welding of joints with multiple sheets is possible in one pass without an increase in processing time, which offers additional freedom in the implementation of especially reliable and cost-effective welding concepts.

The invention is based on the insight that the weld strength and production during the joining by laser of sheet metal parts with flanges can be improved, particularly in car body construction, and that shorter flanges can simultaneously be made possible by performing the weld with the laser beam parallel or substantially parallel to the joint plane with the edges of the sheets flush or substantially flush while simultaneously using the moving clamping system provided in the processing head as well as integrated seam guidance, which is particularly advantageous when welding flange connections on doorways or window cutouts in car body construction.

Preferably, the compensation mechanism has a compensation shaft that corrects positioning errors and a device for monitoring the progression of the joint. Positioning errors can be caused, for example, by the guidance apparatus that moves the overall device. The positioning by the guidance apparatus, for example an industrial robot, need not be quite so precise.

Preferably, the clamping device has clamping means which, when the device is in operation, grip the sheet metal parts to be joined and are connected to the beam guidance system in such a way as to yield a tactile seam guidance. The clamping means have a dual function in this case, namely, on the one hand, the clamping of the sheet metal parts to be joined in the area of the connecting flange to be created and, on the other hand, they are used to guide the laser beam. To this end, the clamping means are connected indirectly or directly, particularly mechanically, to the beam guidance system.

Alternatively or in addition, the device can have means for optical seam guidance. In this case, the device preferably has a receiving beam path coaxial to the laser beam as well as an internal or external illumination unit associated therewith. Especially preferred is a device having two independent illumination units that are associated with the receiving beam path.

The beam guidance system preferably has at least one deflector for deflecting the laser beam in the main clamping direction of the clamping elements in order to enable tracking of the processing point at which the laser beam strikes the sheets to be joined in the main clamping direction of the clamping elements. The deflector preferably comprises at least one rotationally driven mirror for the tracking of the processing point. The embodiment with at least one deflector is preferably embodied with a coaxial receiving beam path and with one or two illumination units associated therewith.

Moreover, it is advantageous if the beam guidance system has at least one optical element which influences the beam angle at which the laser beam runs on a plane perpendicular to the main clamping direction F such that switching between different beam angles is possible in the area of a possible processing point. It is especially preferable here if the beam guidance system has one or more mirrors that are arranged such that, in the area of a possible processing point, switching between different beam angles is possible. It is preferable here that two or more mirrors be arranged such that, upon switching between different beam angles, it results in an optical path of the laser beam from the focusing lens to the processing point that is approximately equal in length. Different optical path lengths can also be compensated as needed by moving the focusing lens or other optical elements.

It should be noted here that the beam angle corresponds to the lateral angle indicated in the example described below.

According to one advantageous embodiment, the clamping means may comprise at least 2 floating tension rollers or, alternatively, a pressure roller.

In relation to the method, it is preferred if the penetration welding is done substantially parallel to the flange plane and substantially perpendicularly to the direction of a clamping force F exerted upon clamping. Angles between beam and flange plane in the range of plus minus 60 degrees are possible here. Preferred are angles in the range of plus minus 45 degrees. Especially preferred are angles between 15 degrees and minus 15 degrees.

Preferably, the laser beam is guided along the connecting flange in a weld-guiding motion relative to the sheet metal parts to be joined, and a position modulation of the position of a processing point at which the laser beam strikes the sheet metal parts to be joined is performed simultaneously in at least one spatial direction and in a manner superimposed on the welding motion.

Moreover, an adjustment of the position of a processing point is preferably provided at which the laser beam strikes sheet metal parts to be joined, the adjustment being performed based on the joint geometry measured by a sensor.

The invention will now be explained in further detail on the basis of sample embodiments with reference to the figures.

Figure 1:
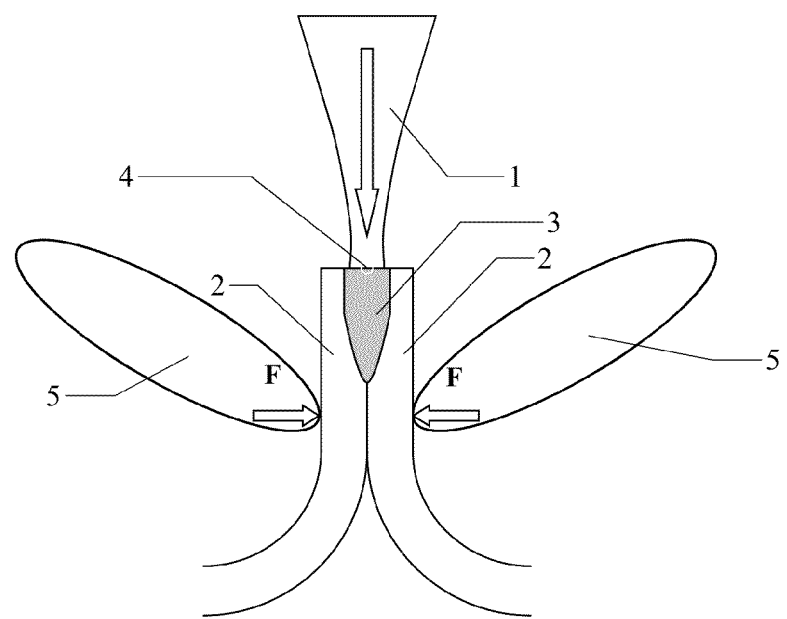
FIG. 1 shows a schematic drawing of a front weld on the lap joint as a two-sheet joint.

The front penetration weld on the lap joint as a two-sheet connection is done according to the schematic drawing (FIG. 1). A laser beam 1 strikes two sheets to be joined, each being provided with a flange, on the planned processing point 4, which is usually located on the joint of the two sheets 2, i.e., where the two flanges of the sheets to be joined abut each other. As part of a clamping device, clamping means 5 exert a force transverse to the separation plane of the flanges 2. As a result of the action of the laser beam 1, a weld 3 forms between the pressed-together flanges which is characterized by a relatively large joint cross section. Unlike in the prior art, the main clamping direction F, which is to say the direction of the acting clamping force, of the mutually counteracting force couples runs substantially perpendicular to the separation plane of the flanges 2.

The joint can be embodied as a continuous connection or as a stitch weld.

The precise orientation of the laser beam 1 onto the processing point 4 is done by the device. One part of the device is solidly connected to a guidance apparatus, for example an industrial robot, whereas other parts can be moved relative to the guidance apparatus and thus enable the device to guide the weld.

Due to the demanding requirements placed on the precision of positioning, seam guidance is necessary. In the device according to the invention, this can be done both mechanically and tactilely by means of integrated mechanical or optical seam guidance in connection with an integrated compensation shaft. The compensation shaft can compensate for positioning errors of the device and the sheets to be joined with respect to each other resulting from imprecisions in positioning by the guidance apparatus and/or of the sheets to be joined, thus preventing damage to the guidance apparatus, component or device.

In the simplest of cases, the positioning of the laser beam 1 is done via the clamping means 5 by coupling a beam guidance system, e.g., beam guidance optics, and the clamping means mechanically or by other means such that a deflection of the clamping means brings about a corresponding deflection of the laser beam. In this way, at least lateral seam guidance (in the Y-direction, see FIG. 5) is possible, which is usually sufficient. If the device is set up appropriately using two compensation shafts and commensurate design of the clamping means, seam guidance in the spacing direction (in the Z-direction, see FIG. 5) would also be possible.

Optical seam guidance in connection with at least one controllable compensation shaft enables the touchless scanning of the joint orientation independently of the relative position of the clamping means to the processing point. At the same time, the position of the laser beam can be altered when using controllable compensation shafts during the processing operation and adapted to the processing conditions. Moreover, optical seam guidance sensor technology, for example by means of light-slit methods, enables measurement of the joint gap and, if needed, the adaptation of processing parameters.

Figure 2:
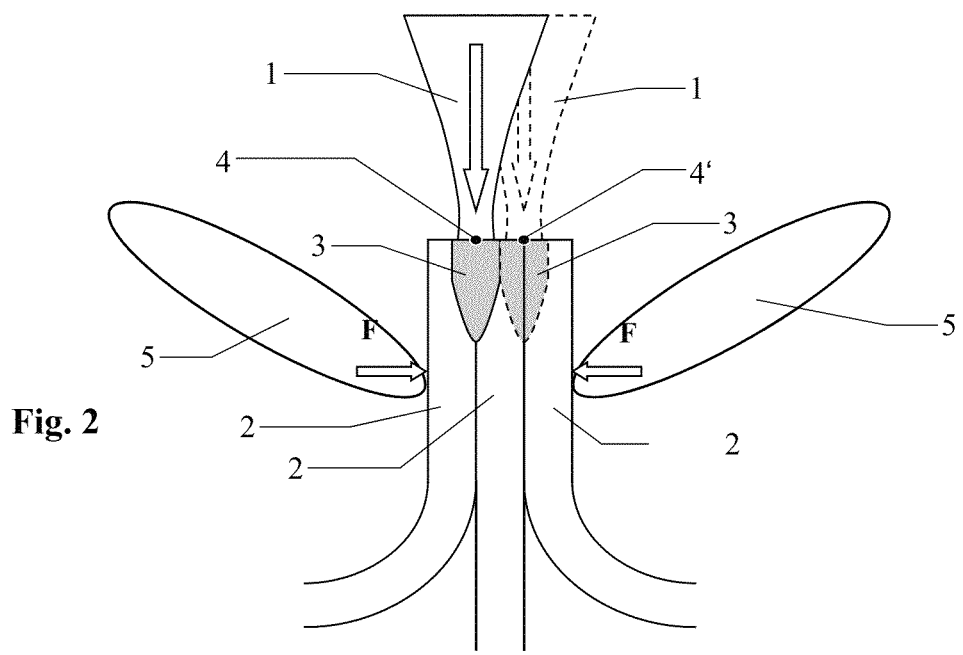
FIG. 2 shows a lap joint with front penetration weld as a three-sheet joint.

FIG. 2 shows a lap joint with front penetration weld in the form of a three-sheet connection. It is preferably embodied as a stitch weld, since the welding of the right joint (broken line) can take place in the welding breaks of the left joint. By quickly switching the laser beam 1 between the two processing positions 4, 4' a continuous relative movement can be used as the overall movement of the device, generated by means of a guidance apparatus, between processing head and component. In an appropriate design according to the invention, a controllable compensation shaft can additionally be used to switch the laser beam.

Figure 3:
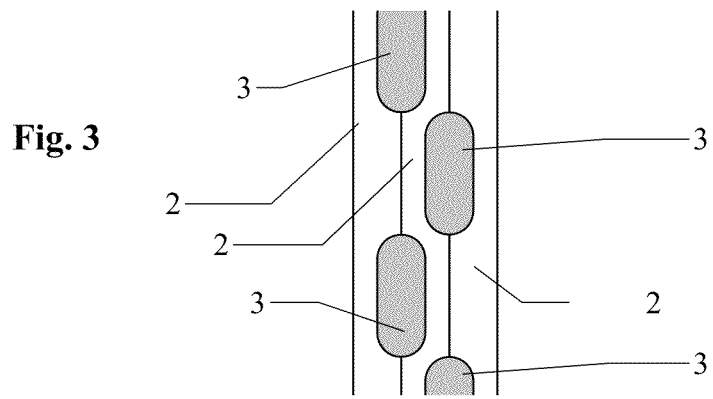
FIG. 3 shows a top view of the lap joint from FIG. 2.

Shown in FIG. 3 is a top view of the three-sheet connection from FIG. 2. The weld seams are staggered with respect to each other. The switching time between the processing positions leads to gaps between the stitches. This principle can also be used to weld four or more layers of sheet metal, since there is accessibility for the laser beam and the joint can be run over practically simultaneously by the laser beam. Here too, moving clamping means 5 bring about a pressing-together of the sheets 2. The seam guidance is done by means of integrated optical seam guidance in connection with at least one compensation shaft integrated into the device.

The reduction in size of the laser spot to approximately half of the sheet thickness constitutes a good opportunity for minimizing zinc burnout and maintaining corrosion protection while simultaneously improving strength through greater weld penetration. Such a small laser spot requires the use of seam guidance, but creates less process heat with less resulting warpage, the reduction of the laser power needed and an increase in the process speed with the same or even greater joint cross section. The moving clamping technology is necessary in order to ensure the contact of the components and to minimize seam collapse. At the same time, it is possible to do away with stationary clamping technology. The penetration-welding of the front side makes it possible to scan the zinc layers of the abutting sheets during joining with the so-called keyhole in the joint zone such that any zinc vapor can flow away unimpeded for the most part upward through the so-called keyhole. The spittings such as those found in an I-seam on the lap joint with zero gap are prevented. Costly degassing support can therefore be omitted.

Figure 4:
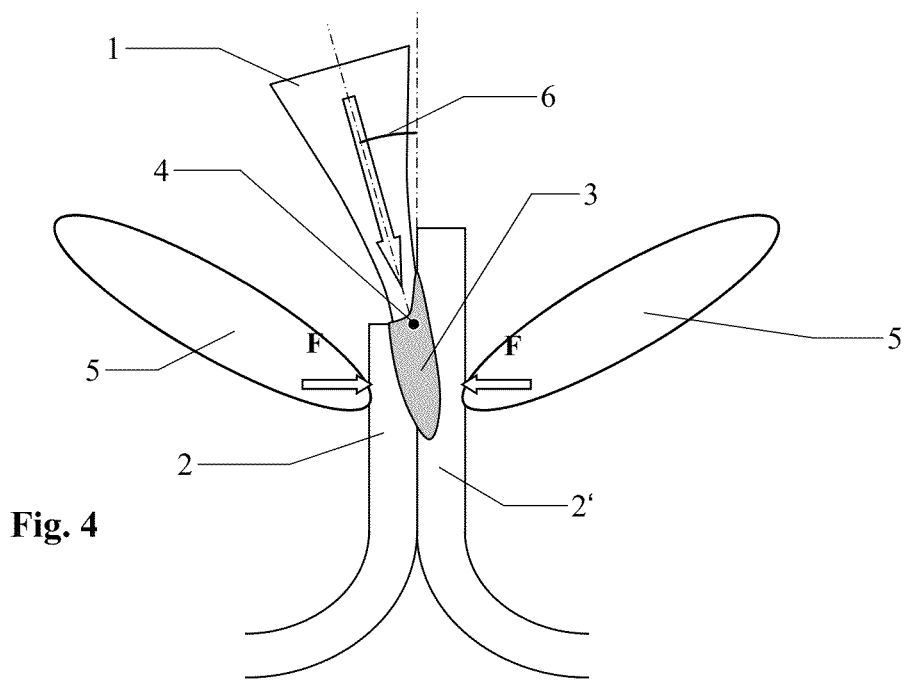
FIG. 4 shows a lap joint with front penetration weld as a two-sheet joint with shifting of the right sheet with respect to the processing point.

FIG. 4 shows a lap joint with front penetration weld in the form of a two-sheet connection with staggering of the right sheet with respect to the processing point 4. In the event that the sheets do not fit flush against each other and therefore do not form a common front surface, a lateral angle 6 can be set up away from the overlapping sheet as shown in section in FIG. 4. This makes it possible to avoid shadowing of the laser beam by the overlapping part of the sheet 2' while nonetheless achieving the required joint cross section at the base of the joint. This can also be applied to multiple-sheet connections.

Following is a description of various sample embodiments of the device according to the invention.

Figure 5:
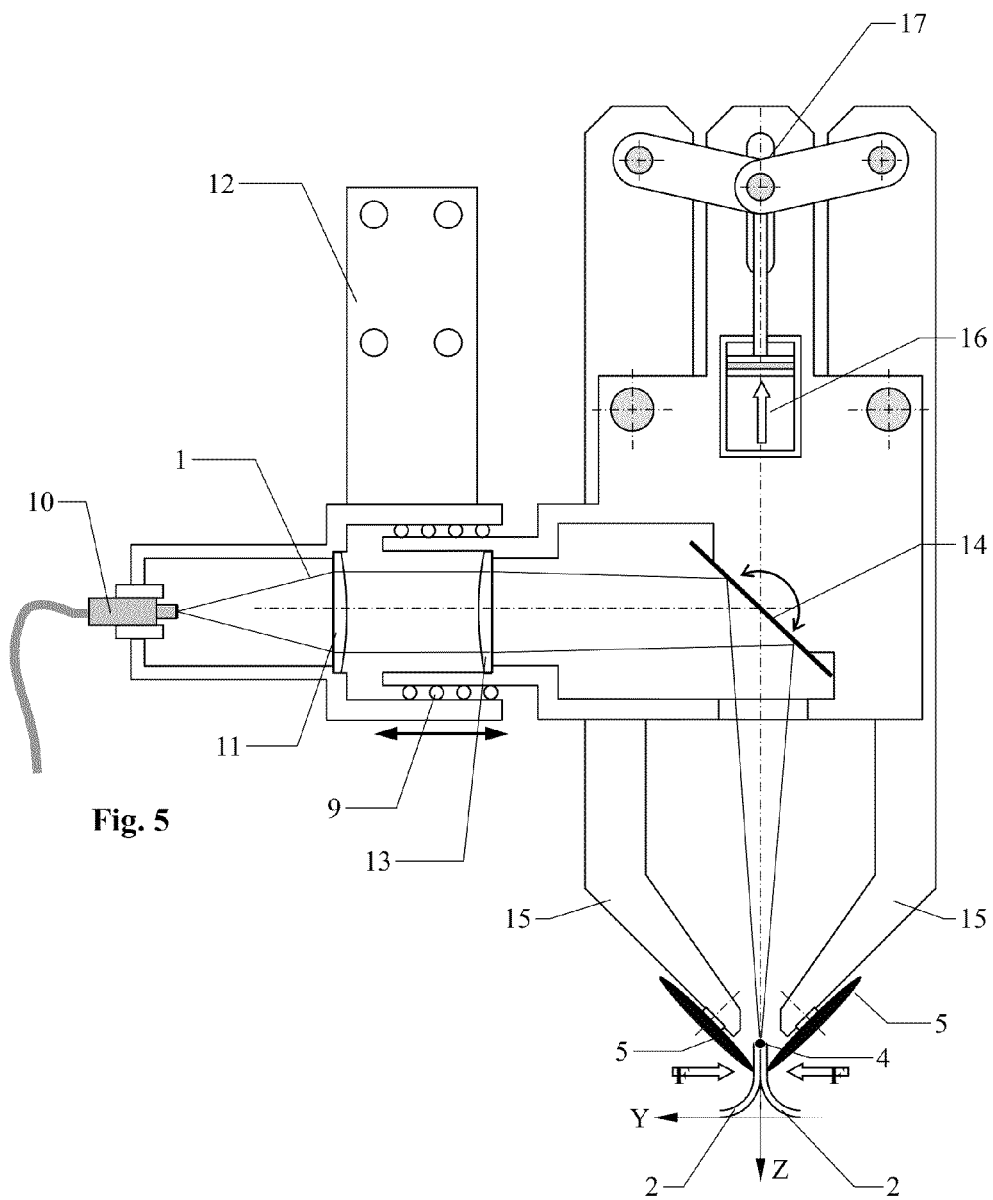
FIG. 5 shows a device for front welding on the lap joint in which tension rollers simultaneously scan the lateral position of the component and a compensation movement is carried out by an integrated compensation shaft.

FIG. 5 shows an embodiment in which tension rollers in the form of tensioning means and part of a clamping device simultaneously scan the lateral position of the flanges of sheets to be joined and an integrated compensation shaft makes a compensation motion.

Figure 6:
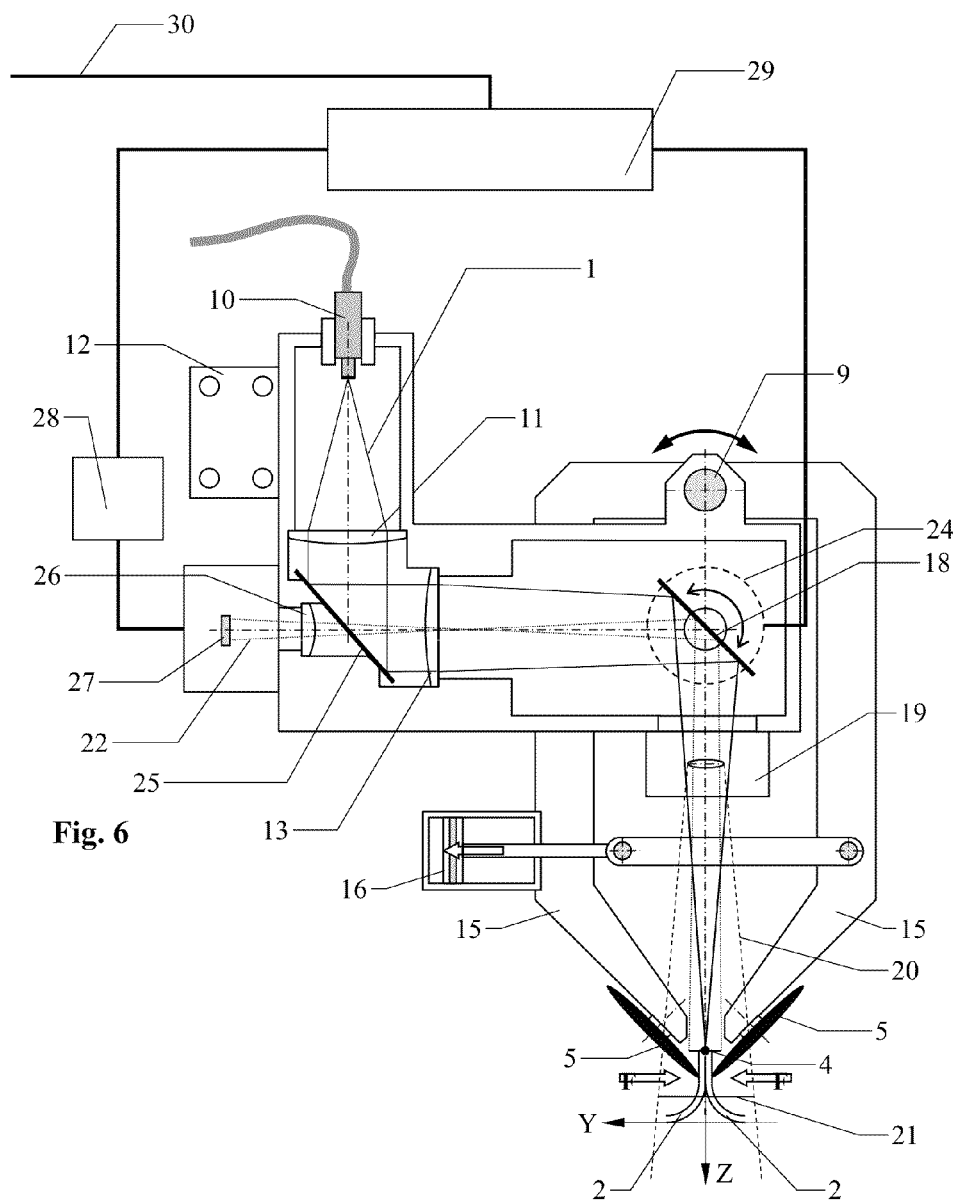
FIG. 6 shows an alternative device for front welding on the lap joint, with floating, mutually counteracting tension rollers that carry out the function of a compensation shaft in connection with an automatically positionable mirror.

FIG. 6 shows another embodiment in which a floating mounting of the mutually counteracting tension rollers performs the function of a compensation shaft in connection with an automatically positionable mirror.

Figure 7:
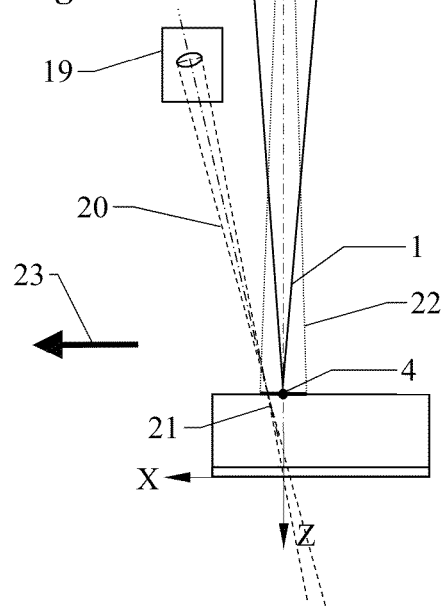
FIG. 7 shows detail of the illumination of the embodiment depicted in FIG. 6.
Figure 7:
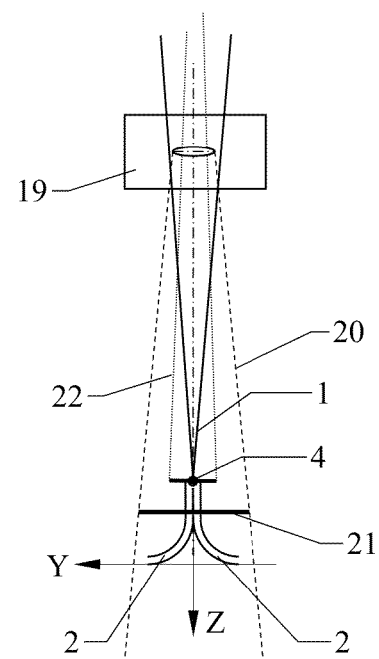

FIG. 7 shows detail of the illumination of the embodiment described in FIG. 6. To the right in the view from the front and to the left in the view from the side.

Figure 8:
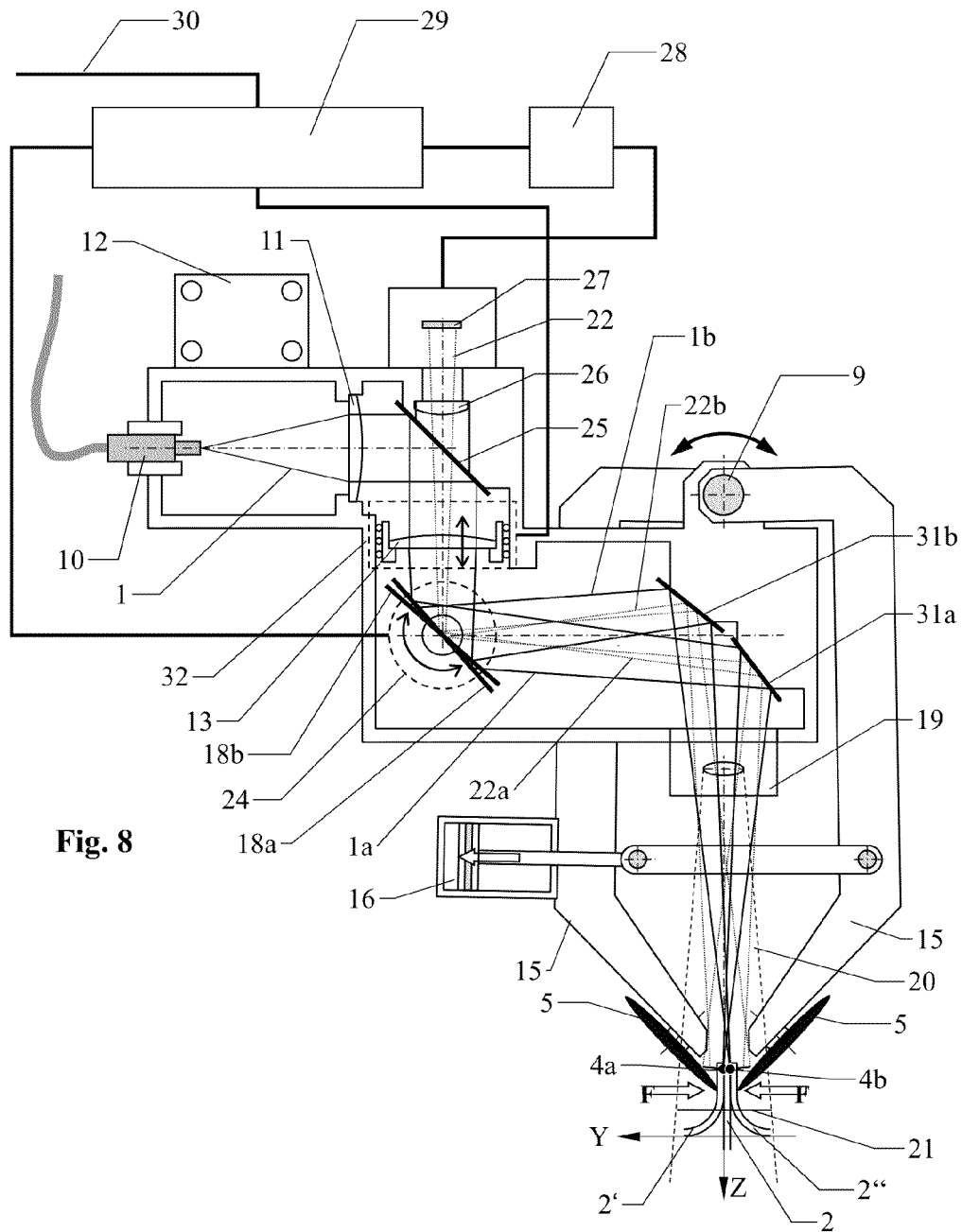
FIG. 8 shows another preferred embodiment for laterally slanted mutual penetration welding with two additional mirrors.

FIG. 8 shows another preferred embodiment for laterally slanting reciprocal penetration welding with two additional mirrors, each of which enables approximately the same optical path of the laser beam from the focusing line to the processing site at different angles of arrival.

One possible embodiment of the invention is depicted in FIG. 5. A laser beam is fed to the device by means of glass fibers via a fiber plug 10 and collimated through a lens 11. Alternatively, the beam feed can take place via a free beam and the lenses can be replaced by other beam-forming elements, such as mirrors. The part of the device which contains the beam feed is solidly connected by means of a mounting flange 12 to a guidance apparatus, for example an industrial robot. The part of the device which primarily carries the focusing apparatus and the clamping means is connected by means of the compensation shaft 9 to the part attached to the guidance apparatus. The compensation shaft 9 preferably contains[1] a spring-loaded, stable central position. The collimated laser beam passes coaxially through the compensation shaft 9. A shifting of the movably mounted parts therefore does not influence the focusing characteristics of the laser beam.

[1] Sic—possible error for "maintains."—Tr.

The focusing apparatus in this possible embodiment comprises a second, focusing lens 13. The focused laser beam 1 strikes an adjustable mirror 14 and is deflected from there to the joint between the roller-like clamping means 5 laterally clamping the sheets. The clamping means can be embodied as rollers, cylinders, or even as finger clamps. The clamping means 5 are attached to symmetrically tensioning tensioning arms 15. The clamping force is transferred symmetrically to the clamping means 5 by means of a pneumatic clamping actuator 16 via positive guide 17 and tensioning arms 15. This can also be done alternatively by means of a hydraulic or electrical actuator, for example. The symmetrical movement of the clamping means centers the laser beam between the flanges 2 of the sheets to be joined. The adjustable mirror 14 is used to adjust the position of the laser beam relative to the processing point 4 according to the processing operation. An altered position of the component formed from the sheets to be joined is compensated by the compensation shaft 9 in the Y-direction through linear shifting of the components of the device movably mounted with respect to the guidance apparatus. Alternatively, rotational compensation shafts are also conceivable for this. The monitoring of the joint is done here indirectly by means of the clamping means 5 via the symmetrical mechanical scanning of the flange geometry while taking the material thickness of the sheets 2 forming the flange into account. Changing thicknesses of the sheets within a component or multiple connections cannot be joined by this simple mechanical device, or only to a limited extent. It is helpful here to equip the adjustable mirror 14 with at least one actuator and to make it into a positionable mirror by means of a suitable control in order, in the case of multiple connections, to enable automatic switching between the joints or, in the case of different sheet thicknesses, a shifting of the processing point in adaptation to the sheet thickness.

FIG. 6 shows another preferred embodiment in which the floating mount of the tensioning arms with mutually counteracting clamping means performs the function of a compensation shaft in connection with the automatically positionable mirror and in which the seam guidance is done by means of an optical sensor integrated into the processing head, instead of through mechanical sensing by the rollers. Alternatively, an advancing conventional optical seam guidance sensor could also be used, with an integrated sensor offering the advantage of compensating for positioning errors of the positionable tilting mirror due to a working laser beam and sensor beam path being routed together and running coaxially. At the same time, the accessibility of the component and its protection from contamination are improved. The mechanical positive guide of the embodiment shown in FIG. 5 is replaced by a control-engineered positive guide that also easily offers the possibility of changing the position of the laser spot during the process.

The laser radiation is fed to the device via the fiber plug 10, collimated by means of a collimating lens 11, and routed over a semi-reflective mirror 25 that is highly reflective for the laser beam 1 to the focusing lens 13 and over a tilting mirror 18 to the processing point 4. The tilting mirror 18 possesses a dynamic, precise positioning drive 24. The clamping means 5 are fastened to tensioning arms 15 which, in this sample embodiment, are float-mounted on a rotational compensation shaft 9. The tensioning force produced by the pneumatic clamping actuator 16 is transferred symmetrically via tensioning arms 15 to the clamping means 5 and the sheets 2 to be joined. The illumination beam path 20 emanating from the illumination device 19 at an angle of preferably 15 to 35 degrees to the laser beam 1 is used to produce a line projection 21 on the surface of the component in the vicinity of the processing point 4. The line projection is shown in FIG. 7 in isolated detail, on the right side in the view from the front and on the left side in the view from the side. The incidence of the line projection 21 occurs within the visual range of the receiving beam path 22 advancing in front of the processing point 4 in the processing direction 23. The light scattered diffusely from the component is projected via the receiving beam path 22, which is substantially coaxial to the laser beam 1, via the positionable tilting mirror 18, through the focusing lens 13, the semi-reflective mirror 25 and the imaging lens 26 and onto the image sensor 27. The analysis of the image of the so-called light slit and the conversion into sensor position values is done in the image processing unit 28. The illumination unit 19 with the line projection 21 together with imaging lens 26, image sensor 27 and image processing unit 28 constitute the integrated optical seam guidance sensor. The position of the laser beam relative to the image of the light slit can be calibrated and, due to the coaxial principle, does not change upon movement of the tilting mirror 18. The calculation of the position of the processing point 4 in the lateral and gap direction is done in the control unit 29 under offsetting of the mirror position of the tilting mirror 18 and the measurement values of the light slit. At the same time, the control unit 29 performs position control to monitor the seam by positioning the tilting mirror such that the calibrated position of the processing beam and the target position of the measured joint geometry coincide. A lateral positional deviation that can arise upon deviations of the programmed guidance path from the component geometry is compensated by the floating mount of the compensation shaft 9 and by the integrated seam guidance sensor by means of tilting mirror 18. A certain positive guidance arises here as well. The control unit 29 also makes it possible for the tilting mirror 18 to be positioned such that the laser beam can be guided with offsets along the joint. The activation, acknowledgement and parameterization of the functions of the device are enabled via the provided external interface 30 of the control unit 29. Protective mechanisms such as protective glasses and crossjet are not shown but are presumed for an implementation that suits industrial needs.

FIG. 7 shows a particularly preferred embodiment whose fundamental functional principle is identical to the embodiment in FIG. 6. In addition, two mirrors 31a and 31b are arranged such that the laser beam can shine on the component at two different angles to the flange plane. In this example of a three-sheet connection, the outer sheets are the two sheets 2', 2" overlapping with respect to the inner sheet 2. Here, in contrast to the embodiment depicted in FIG. 6, the positioning drive 24 is used not only as an actuator for focus correction for seam monitoring, but also as a switch for the processing of the connection of inner sheet 2 with left-overlapping sheet 2' and of inner sheet 2 with right-overlapping sheet 2" with simultaneous switching of the angle of arrival. To prevent process-detrimental shadowing, the laser beam (as also shown in FIG. 4) must shine on the component each time at a lateral angle away from the sheet overlapping on the joint. To solve this problem, two additional mirrors are arranged in this embodiment such that one deflecting mirror 31a deflects the laser beam 1a emanating from the tilting mirror in position A 18a to the processing point for position A 4a of the connection between left outer sheet 2' and the inner sheet 2, and the other deflecting mirror 31b deflects the laser beam 1b emanating from the tilting mirror in position B 18b to the processing point for position B 4b of the connection between right outer sheet 2" and the inner sheet 2. The overall arrangement is structured here such that the optical paths of the laser beams 1a and 1b are approximately the same between focusing line 13 and the respective processing points 4a and 4b, in the sense of an area which has no influence on the processing operation. If more angles of arrival are required for processing, it is also possible to use more mirrors in analogous fashion. The illumination unit 19 with the line projection 21 together with imaging lens 26, image sensor 27 and image processing unit 28 comprise the integrated optical seam guidance sensor, the image of the line projection 21 of the processing point for position A 4a being reproduced by one mirror 31a and the image of the line projection 21 of the processing point for position B 4b being reproduced by the other mirror 31b via the tilting mirror in the respective position 18a and 18b and the imaging lens 26 back onto the image sensor 27. Alternatively, more than one illumination unit can also be arranged. Active illumination and receiving beam path must be calibrated together. In different processing situations, such as, for example, orientations of the device with respect to the component, the several illumination units can act as independent sensors in connection with the coaxial beam path, so that better illumination of the joint can be achieved or excessive shadowing by the overlapping sheets can be avoided. In addition, this embodiment of the device is equipped with an apparatus for shifting the laser focus in the direction of the beam. For this purpose, the focusing line 13 is arranged so as to be movable and positionable by the control 29 via a corresponding focusing drive 32. Alternatively, other elements can also be used in the optical system for this purpose in order to influence the focus position in the beam direction. The focusing drive 32 also makes it possible to adapt the beam spot size to the process or the joint gap. Moreover, the positioning drive 24 can be used to modulate the lateral position. In a two-shaft embodiment of the drive, or when an additional mirror is used, modulation in the direction of travel is also possible. This enables coating- and process-adapted motion overlays.

LIST OF REFERENCE SYMBOLS

Symbol Description
1 laser beam
1a laser beam for position A
1b laser beam for position B
2 sheet
2', 2" overlapping sheet
3 weld seam
4, 4' processing point
4a processing point for position A
4b processing point for position B
5 clamping means
6 lateral angle
7 mechanical seam guidance
8 optical seam guidance sensor
9 compensation shaft
10 fiber plug
11 collimating lens
12 mounting flange
13 focusing lens
14 adjustable mirror
15 tensioning arm
16 clamping actuator
17 positive guide
18 tilting mirror
18a tilting mirror in position A
18b tilting mirror in position B
19 illumination unit
20 illumination beam path
21 line projection
22 receiving beam path
22a receiving beam path for position A
22b receiving beam path for position B
23 processing direction
24 positioning drive
25 semi-reflective mirror
26 imaging lens
27 image sensor
28 image processing unit
39 control unit
30 interface
31a deflecting mirror for position A
31b deflecting mirror for position B
F focusing drive

The invention claimed is:

1. A device for joining sheet metal parts, each with a flange, by laser, wherein the flanges of the sheet metal parts are joined into one connecting flange, in which the flanges of the sheets to be joined abut flat against each other and thus form a joint with a flange plane wherein the device has clamping device to clamp the sheet metal parts to be joined in a main clamping direction running transversely to the connecting flange and a beam guidance system for a laser beam which is designed to route a laser beam substantially parallel to the connecting flange and transverse to the clamping direction to a front side of at least one of the flanges of the sheet metal parts be joined, wherein the device further comprises a compensation shaft which, when the device is connected to a guidance apparatus, tracks the laser beam according to a relative motion between the connecting flange and the guidance apparatus characterized in that the beam guidance system has at least one optical element with which a beam angle at which the laser beam runs on a plane perpendicular to the main clamping direction is to be influenced in such a way that switching between different beam angles is possible in the area of a possible processing point such that in each instance a lateral angle is produced away from a sheet part projecting beyond the joint and that the device has an apparatus for monitoring the progression of the joint and the compensation mechanism has a compensation shaft that compensates positioning errors.

2. The device as set forth in claim 1, wherein the compensation shaft is implemented mechanically or optically.

3. The device as set forth in claim 1, wherein the parts of the device which jointly move the clamping device and processing points in which the laser beam strikes the connecting flange are connected by means of at least one compensation shaft to a part attached to the guidance apparatus.

4. The device as set forth claim 1, wherein the clamping device has clamping means that grip sheet metal parts to be joined during operation of the device and are connected to the beam guidance system so as to result in tactile seam guidance.

5. The device as set forth in claim 1, wherein the device has means for optical seam guidance.

6. The device as set forth in claim 5, wherein the device has a receiving beam path coaxial to the laser beam as well as an internal or external illumination unit associated therewith.

7. The device as set forth in claim 6, wherein the device has two independent illumination units which are associated with the receiving beam path.

8. The as set forth in claim 1, wherein the beam guidance system has at least one deflector for deflecting the laser beam in the main clamping direction of the clamping elements in order to track the processing point at which the laser beam strikes the sheets to be joined in the main clamping direction of the clamping elements.

9. The device as set forth in claim 8, that wherein the deflecting element has at least one rotationally driven mirror for the tracking of the processing point.

10. The device as set forth in claim 1, wherein the beam guidance system has as an optical element one or more mirrors which are arranged such that it is possible to switch between different beam angles in the area of a possible processing point.

11. The device as set forth in claim 1, wherein the beam guidance system has as an optical element two or more mirrors which are arranged such that, upon switching between different beam angles, this results in an optical path of the laser beam from the focusing lens to the processing point that is approximately equal in length.

12. A method for joining sheet metal parts, each with a flange, by laser, wherein the flanges of the sheet metal parts are joined into one connecting flange, with the method steps:

moving clamping of sheet metal parts in the area of the connecting flange in a main clamping direction running transverse to the connecting flange and simultaneous front-side penetration welding on the connecting flange through orientation of a laser beam substantially parallel to the connecting flange and transverse to the main clamping direction to a front side of at least one of the flanges of the sheet metal parts (2) to be joined, characterized in that the processing point is guided in the main clamping direction and/or in the gap direction along the connecting flange in a seam guidance direction relative to the sheet metal parts to be joined and that in the event that the sheet metal parts do not fit flush against each other and thus fail to form a common front surface, a lateral angle is set up away from a sheet metal part projecting from the joint.

13. The method as set forth in claim 12, wherein a seam guidance motion-overlaid positional modulation of the position of a processing point at which the laser beam strikes sheet metal parts to be joined occurs in at least one spatial direction.

14. The method as set forth in claim 12, wherein control of the position of a processing point at which the laser beam strikes sheet metal parts to be joined and/or beam modulation and/or adaptation of the laser power based on the joint geometry measured by a sensor occurs.

* * * * *